US011963595B2

(12) United States Patent
Crye

(10) Patent No.: US 11,963,595 B2
(45) **Date of Patent: *Apr. 23, 2024**

(54) MULTIPURPOSE BAG TABLE APPARATUS

(71) Applicant: Caleb Crye, Brooklyn, NY (US)

(72) Inventor: Caleb Crye, Brooklyn, NY (US)

( * ) Notice: Subject to any disclaimer, the term of this patent is extended or adjusted under 35 U.S.C. 154(b) by 297 days.

This patent is subject to a terminal disclaimer.

(21) Appl. No.: 17/039,109

(22) Filed: Sep. 30, 2020

(65) Prior Publication Data

US 2021/0267331 A1 Sep. 2, 2021

Related U.S. Application Data

(63) Continuation of application No. 16/804,683, filed on Feb. 28, 2020, now Pat. No. 10,973,292.

(51) Int. Cl.

| | |
|---|---|
| ***A45C 9/00*** | (2006.01) |
| ***A45C 7/00*** | (2006.01) |
| ***A45C 13/26*** | (2006.01) |
| ***B25H 1/04*** | (2006.01) |

(52) U.S. Cl.

CPC .............. *A45C 9/00* (2013.01); *A45C 7/0095* (2013.01); *A45C 13/262* (2013.01); *B25H 1/04* (2013.01); *A45C 2200/15* (2013.01)

(58) Field of Classification Search

CPC ....... A45C 9/00; A45C 7/0095; A45C 13/262; A45C 2200/15; B25H 1/04

See application file for complete search history.

(56) References Cited

U.S. PATENT DOCUMENTS

| | | | | |
|---|---|---|---|---|
| 52,196 A * | 1/1866 | Perdtheron | .............. | A45C 9/00 108/34 |
| 1,584,377 A | 3/1923 | Johnson | | |
| 3,156,510 A | 11/1964 | Hindin et al. | | |
| 3,620,587 A * | 11/1971 | Ahmann | ................ | A47B 43/00 312/258 |
| 3,734,595 A | 5/1973 | Bendzick | | |

(Continued)

FOREIGN PATENT DOCUMENTS

KR 10-1994413 B1 6/2019

OTHER PUBLICATIONS

International Search Report and Written Opinion for corresponding PCT/US2021/018355, dated Jun. 10, 2021, 10 pages.

*Primary Examiner* — Tri M Mai

(74) *Attorney, Agent, or Firm* — Patterson Intellectual Property Law, P.C.; Ryan D. Levy

(57) ABSTRACT

A combination bag workbench is provided herein. The combination bag workbench may include a rectangular bottom portion, a pair of wheels, and four legs rotatably coupled to the bottom portion. The bottom portion may include a length, a width, a pair of lengthwise sides defined parallel to the length, and a pair of widthwise sides defined parallel to the width. The pairs of lengthwise and widthwise sides define corners of the bottom portion. The pair of wheels may be coupled to the bottom portion along one widthwise side of the pair widthwise sides. Each leg may be coupled adjacent to a respective corner of the bottom portion. The four legs are configurable in a retracted position or an extended position associated with at least one of the legs extending beyond at least one of a nearest respective lengthwise side or a nearest respective widthwise side.

20 Claims, 11 Drawing Sheets

(56) References Cited

U.S. PATENT DOCUMENTS

| | | | | |
|---|---|---|---|---|
| 3,915,529 | A * | 10/1975 | Bernier | A47B 3/10<br>312/282 |
| 4,445,731 | A * | 5/1984 | Ahmann | E04H 1/1255<br>312/231 |
| 4,702,029 | A | 10/1987 | DeVaul et al. | |
| 4,856,627 | A | 8/1989 | Polatov | |
| 6,068,355 | A | 5/2000 | Thorp | |
| 6,334,519 | B1 * | 1/2002 | Tong | A45C 7/0086<br>190/110 |
| 8,016,089 | B1 | 9/2011 | McNichols | |
| 9,683,810 | B2 | 6/2017 | Perkinson | |
| 10,578,389 | B2 | 3/2020 | Kinney et al. | |
| 10,973,292 | B1 * | 4/2021 | Crye | A45C 13/262 |
| 2002/0017766 | A1 | 2/2002 | Thompson | |
| 2002/0063072 | A1 | 5/2002 | Pham | |
| 2003/0221924 | A1 * | 12/2003 | Tong | A45C 11/20<br>190/110 |
| 2006/0130718 | A1 | 6/2006 | Lo et al. | |
| 2012/0223494 | A1 | 9/2012 | Greene et al. | |
| 2015/0223598 | A1 | 8/2015 | Roy et al. | |
| 2019/0000228 | A1 * | 1/2019 | Campbell, Jr. | A45F 4/02 |

* cited by examiner

MULTIPURPOSE BAG TABLE APPARATUS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: U.S. patent application Ser. No. 16/804,683 filed Feb. 28, 2020, entitled “Multipurpose Bag Table Apparatus.”

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

1. Field of the Invention

The present invention relates generally to travel containers such as bags. More particularly, the present invention pertains to travel containers which transform and have extendable legs to create elevated work surfaces.

2. Description of the Prior Art

Traditional rolling bags or cases are able to be used on the ground or on a table upon which the bag or case rests. Working from the bag or case on the ground is inherently uncomfortable. Gear bags and cases must be placed on a table-height surface, such as a truck tailgate, a bench, or a table, if available, to work out of them comfortably. This may be extremely inconvenient because these surfaces are rarely available and/or abundant where the bag or case is to be used. The user typically just opts to operate out of the bag or case on the ground. This can be particularly troublesome for people with bad backs, the elderly, or when working on a project that requires lots of movement (i.e., repetitively standing and returning back to the bag or case).

BRIEF SUMMARY

Accordingly, a need exists for a bag or case that converts into a work surface at a typical work surface height. Provided herein is a bag workbench, or case workbench, which includes retractable legs that can selectively extend therefrom to create an elevated work surface. The bag workbench is able to transport gear and tools, as well as many other items, and place them at a much more useful and convenient height as compared to working from the ground. The bag workbench includes a built-in work surface and various organizational pouches and slots around the work surface for organizing gear, tools, and the like. The retractable legs deploy quickly and are sturdy to support an elevated work surface.

The bag workbench is ideal for outdoor sports enthusiasts, such as campers, dirt bikers, all-terrain vehicle (ATV) users, mountain bikers, shooting sports enthusiasts, paintball players, airsoft players, sporting event tailgaters, and technicians who have to work outdoors. The bag workbench is also ideal for travelers who need to keep gear organized and need a convenient way of accessing it. Additionally, the bag workbench is also ideal for workers who need gear, tools, and a work surface at an on-location remote site (e.g., tradeshows, construction trades, maintenance trades, event managers, disaster/emergency response teams, on-site law enforcement and medical teams.

According to one aspect of the present disclosure, there is provided a combination bag workbench. The combination bag workbench comprises a rectangular bottom portion, first and second wheels, a first leg, a second leg, a third leg, and a fourth leg. The rectangular bottom portion includes a length, a width, a first and second lengthwise sides defined parallel to the length, and a first and second widthwise sides defined parallel to the width. The first and second wheels are coupled to the bottom portion along the first widthwise side. The first leg may be rotatably coupled to the bottom portion nearer to the first lengthwise side than to the second lengthwise side and nearer to the first widthwise side than to the second widthwise side. The second leg may be rotatably coupled to the bottom portion nearer to the second lengthwise side than to the first lengthwise side and nearer to the first widthwise side than to the second widthwise side. The third leg may be rotatably coupled to the bottom portion nearer to the first lengthwise side than to the second lengthwise side and nearer to the second widthwise side than to the first widthwise side. The fourth leg may be rotatably coupled to the bottom portion nearer to the second lengthwise side than to the first lengthwise side and nearer to the second widthwise side than to the first widthwise side. The first, second, third, and fourth legs may be positionable in a retracted position between the first and second lengthwise sides and between the first and second widthwise sides. The first, second, third, and fourth legs may also be positionable in an extended position with at least one of the leg extending downwardly and laterally beyond at least one of a nearest lengthwise side of the first and second lengthwise sides or a nearest widthwise side of the first and second widthwise sides.

According to another aspect of the combination bag workbench, at least one of the first, second, third, and fourth legs may be positioned parallel to the length of the bottom portion when in the retracted position.

According to yet another aspect of the combination bag workbench, the first wheel may at least partially overlap the first lengthwise side and the second wheel may at least partially overlap the second lengthwise side.

According to another aspect of the combination bag workbench, the bottom portion may include recesses for at least partially receiving the first, second, third, and fourth legs. In accordance with this aspect, at least two of the first, second, third, and fourth legs when in the retracted position may function as skids for protecting an underside of the bottom portion of the combination bag workbench.

According to still another aspect of the combination bag workbench, at least one of the first, second, third, and fourth legs may be lockable in the retracted position and in the extended position.

According to another aspect of the combination bag workbench, at least one of the first, second, third, and fourth legs may be independently adjustable when in the extended position for levelling the bottom portion relative to an uneven support surface upon which the legs interact.

According to another aspect of the combination bag workbench, the combination bag workbench may further include a handle coupled to the bottom portion and extendable from the second widthwise side of the bottom portion.

According to another aspect of the combination bag workbench, the bottom portion may be formed from a rigid material.

According to another further aspect of the combination bag workbench, the combination bag workbench may include a separable worksurface positioned on top of the bottom portion between the first and second lengthwise and widthwise sides.

According to another aspect of the combination bag workbench, the first and second lengthwise and widthwise sides may extend upwardly from the bottom portion to define an upper opening of the bottom portion. In accordance with this aspect, the worksurface may be configured to cover the upper opening of the bottom portion.

According to yet another aspect of the combination bag workbench, the first and second lengthwise and widthwise sides may extend upwardly from an underside of the bottom portion by a common height to define an upper opening of the bottom portion.

According to another aspect of the combination bag workbench, the first and second wheels may include a common diameter. In accordance with this aspect, the common height may be at least as great as one-half of the common diameter.

According to another aspect of the combination bag workbench, the combination bag workbench may further include a top portion coupled to the bottom portion opposite the first, second, third, and fourth legs.

According to yet another aspect of the combination bag workbench, the combination bag workbench may further include a rectangular worksurface positionable between the bottom portion and the top portion. The rectangular worksurface may be unobstructed on at least two sides when the top portion is in an open configuration.

According to still another aspect of the combination bag workbench, the top portion may include a middle panel coupled to the first lengthwise side, a first end panel hingedly coupled to the first widthwise side, and a second end panel hingedly coupled to the second widthwise side. The middle panel may include a free end positioned opposite the first lengthwise side. The free end may be removably couplable to the second lengthwise side. The first and second end panels may be removably couplable to first and second sides of the middle portion.

According to another aspect of the combination bag workbench, the first and second end panels when hinged open may extend away from and below the upper opening.

According to still another aspect of the combination bag workbench, the top portion may include a continuous zipper for coupling the first and second end panels to the middle panel and for coupling the middle panel to the second lengthwise side of the bottom portion.

According to another aspect of the combination bag workbench, the continuous zipper may include two downwardly open U-shaped portions surrounding the first and second end panels, respectively.

According to another aspect of the combination bag workbench, the top portion further may include a front panel hingedly coupled to the second lengthwise side. The front panel may be couplable to the first and second end panels.

According to further aspects of the present disclosure, there is provided a multipurpose bag apparatus. The multipurpose bag apparatus includes a rectangular base, a pair of wheels, and four legs. The rectangular base includes a length, a width, a pair of lengthwise sides defined parallel to the length, and a pair of widthwise sides defined parallel to the width. The pairs of lengthwise and widthwise sides define corners of the base. The pair of wheels are coupled to the base along one widthwise side of the pair of widthwise sides. The four legs may be pivotally coupled to the base. Each leg may be coupled adjacent to a respective corner of the base. The four legs may be configurable in one of a pivoted-in position or a pivoted-out position. The four legs when in the pivoted-in position may be received within a perimeter of the base. The four legs when in the pivoted-out position may extend beyond at least one of a respective lengthwise side or a respective widthwise side of the pairs of lengthwise and widthwise sides.

DETAILED DESCRIPTION

Figure 1:
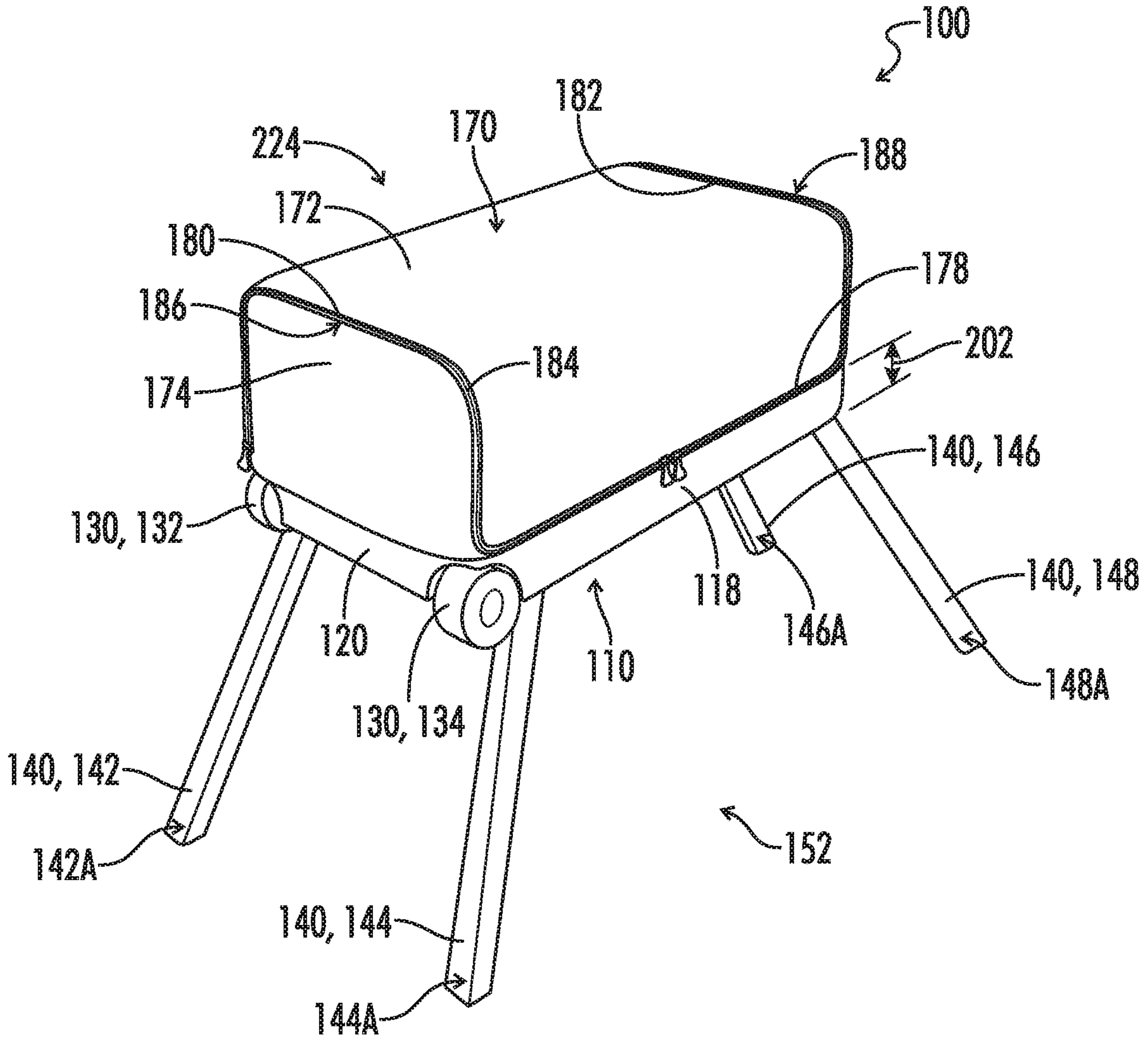
FIG. 1 is a top perspective view of a combination bag workbench with legs in an extended position in accordance with the present disclosure.
Figure 2:
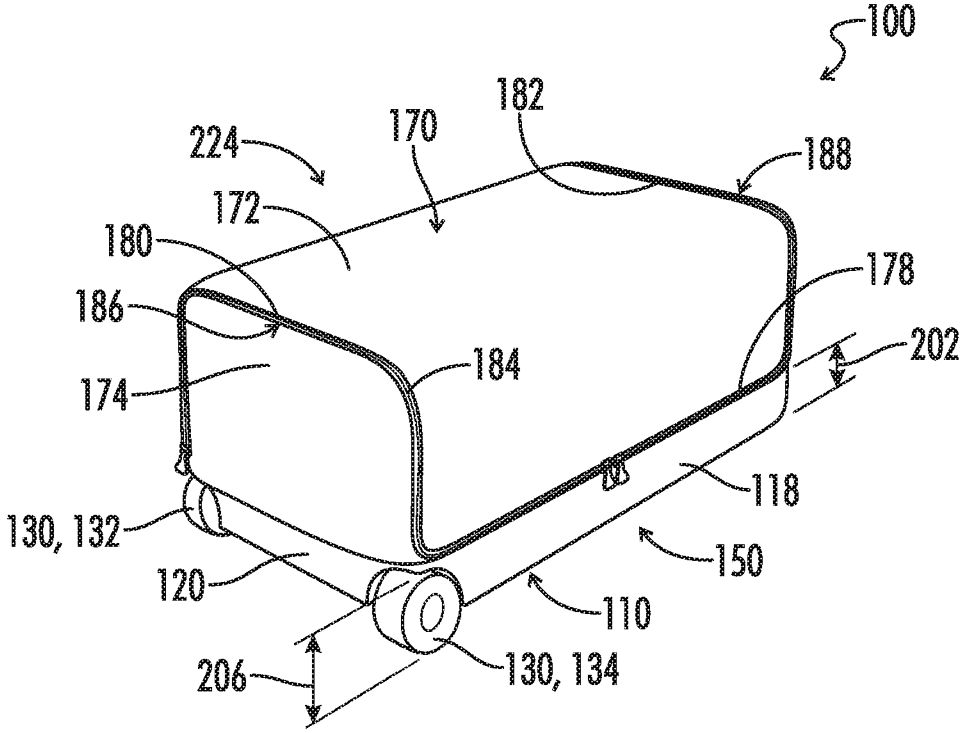
FIG. 2 is a top perspective view of the combination bag workbench of FIG. 1 with the legs in a retracted position in accordance with the present disclosure.

Reference will now be made in detail to embodiments of the present disclosure. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words “connected”, “attached”, “joined”, “mounted”, “fastened”, and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Referring to FIGS. 1-11, a combination bag workbench 100 is shown. The combination bag workbench 100 may also be referred to herein as a bag workbench 100, a multipurpose bag apparatus 100, a combination case workbench 100, a case workbench 100, or a multipurpose case apparatus 100. The bag workbench 100 comprises a rectangular bottom portion 110, a pair of wheels 130, and four legs 140. The rectangular bottom portion 110 may also be referred to herein as a rectangular base 110, a base 110, or a bottom portion 110. The bottom portion 110 includes a length 112, a width 114, a first lengthwise side 116, a second lengthwise side 118, a first widthwise side 120, and a second widthwise side 122. The first and second lengthwise sides 116, 118 are spaced apart from one another and may be parallel to the length 112. The first and second widthwise sides are spaced apart from one another and may be defined parallel to the width 114. The first and second lengthwise sides 116, 118 define a pair of lengthwise sides. The first and second widthwise sides 120, 122 define a pair of widthwise sides. The first and second lengthwise and widthwise sides 116, 118, 120, 122 may be adjoined to defined four corners 124 of the bottom portion 110. The first and second lengthwise and widthwise sides 116, 118, 120, 122 also define a perimeter 126 of the bottom portion 110.

The pair of wheels 130 may include a first wheel 132 and a second wheel 134. The pair of wheels 130 may be coupled to the bottom portion 110 along one of the first or second widthwise sides 120, 122. As illustrated, the pair of wheels 130 are coupled to the bottom portion 110 along the first widthwise side 120. In certain embodiments, the first wheel 132 may at least partially overlap the first lengthwise side 116, and the second wheel 134 may at least partially overlap the second lengthwise side 118. In other embodiments, the first and second wheels 132, 134 may terminate flush with the first and second lengthwise sides 116, 118. The pair of wheels 130 may be selected or designed such that they roll well on both smooth and rough terrain (e.g., dirt, gravel, roots, etc.). The pair of wheels 130 may be wider and slightly soft. The width, diameter, and material (e.g., slightly soft) may enable the pair of wheels 130 to function well on a wide variety of surfaces.

The four legs 140 may be pivotally or rotatably coupled to the bottom portion 110. The four legs 140 include a first leg 142, a second leg 144, a third leg 146, and a fourth leg 148. Each leg of the four legs 140 may be coupled adjacent to a respective corner of the four corners 124 of the bottom portion 110. For example, the first leg 142 may be rotatably coupled to the bottom portion 110 nearer to the first lengthwise side 116 than to the second lengthwise side 118 and nearer to the first widthwise side 120 than to the second widthwise side 122. Accordingly, the first leg 142 may be rotatably coupled adjacent to a first corner 124A of the four corners 124 of the bottom portion 110. The second leg 144 may be rotatably coupled to the bottom portion 110 nearer to the second lengthwise side 118 than to the first lengthwise side 116 and nearer to the first widthwise side 120 than to the second widthwise side 122. Accordingly, the second leg 144 may be rotatably coupled adjacent to a second corner 124B of the four corners 124 of the bottom portion 110. The third leg 146 may be rotatably coupled to the bottom portion 110 nearer to the first lengthwise side 116 than to the second lengthwise side 118 and nearer to the second widthwise side 122 than to the first widthwise side 120. Accordingly, the third leg 146 may be rotatably coupled adjacent to a third corner 124C of the four corners 124 of the bottom portion 110. The fourth leg 148 may be rotatably coupled to the bottom portion 110 nearer to the second lengthwise side 118 than to the first lengthwise side 116 and nearer to the second widthwise side 122 than to the first widthwise side 120. Accordingly, the fourth leg 148 may be rotatably coupled adjacent to a fourth corner 124D of the four corners 124 of the bottom portion 110.

The four legs 140 may be configurable in a retracted position 150 (shown in FIGS. 2 and 4-6) or an extended position 152 (shown in FIGS. 1, 3, and 7-11). The retracted position 150 may also be referred to herein as a pivoted-in position 150. The extended position 152 may also be referred to herein as a pivoted-out position 152. The four legs 140 may be received within the perimeter 126 of the bottom portion 110 when configured in the retracted position 150. The four legs 140 extend downwardly away from the bottom portion 110 when configured in the extended position 152. Each of the four legs 140 includes a terminal portion 142A, 144A, 146A, 148A associated with the first, second, third, and fourth legs 142, 144, 146, 148, respectively. The terminal portion 142A, 144A, 146A, 148A may also be referred to herein as a foot 142A, 144A, 146A, 148A. When configured in the extend position 152, the terminal portion 142A, 144A, 146A, 148A of each leg extends and is, at least partially, positioned laterally beyond at least one of a nearest lengthwise side of the first and second lengthwise sides 116, 118 and/or laterally beyond a nearest widthwise side of the first and second widthwise sides 120, 122. In certain optional embodiments, when configured in the extend position 152, the terminal portion 142A, 144A, 146A, 148A of at least one leg extends and is, at least partially, positioned laterally beyond at least one of a nearest lengthwise side of the first and second lengthwise sides 116, 118 and/or laterally beyond a nearest widthwise side of the first and second widthwise sides 120, 122.

Figure 3:
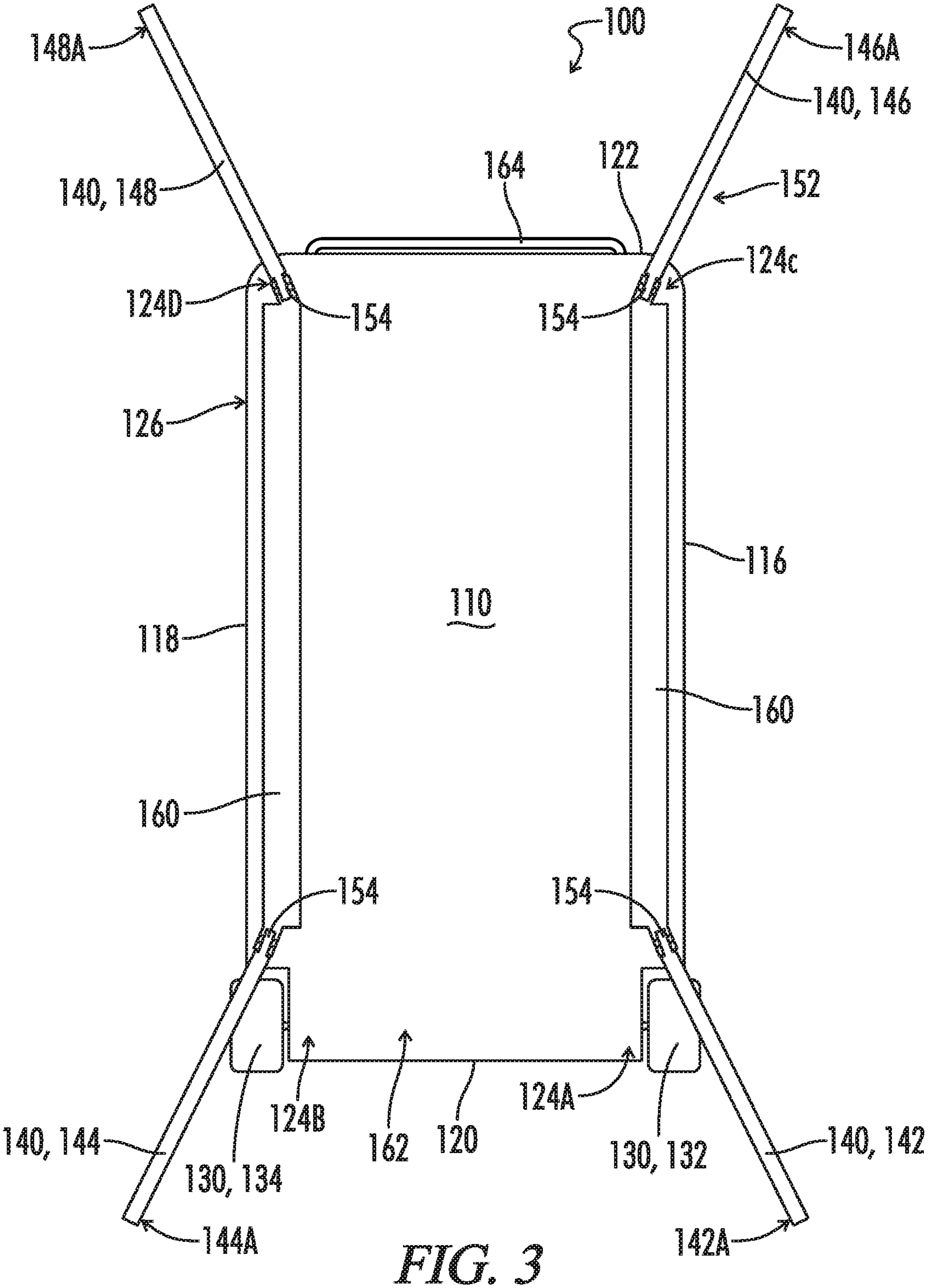
FIG. 3 is a bottom plan view of the combination bag workbench of FIG. 1.

As illustrated in FIG. 3, the terminal portion 142A, 144A, 146A, 148A of each leg extends and is positioned laterally beyond the nearest lengthwise side of the first and second lengthwise sides 116, 118, and laterally beyond the nearest widthwise side of the first and second widthwise sides 120,

122. When the four legs 140 are in the extended position 152, a footprint is defined by the terminal portion 142A, 144A, 146A, 148A of each leg. A perimeter of the footprint may be greater than the perimeter 126 of the bottom portion 110 in order to increase the stability of the bag workbench 100 when the bottom portion 110 is elevated above a support surface 102 using the four legs 140.

Figure 4:
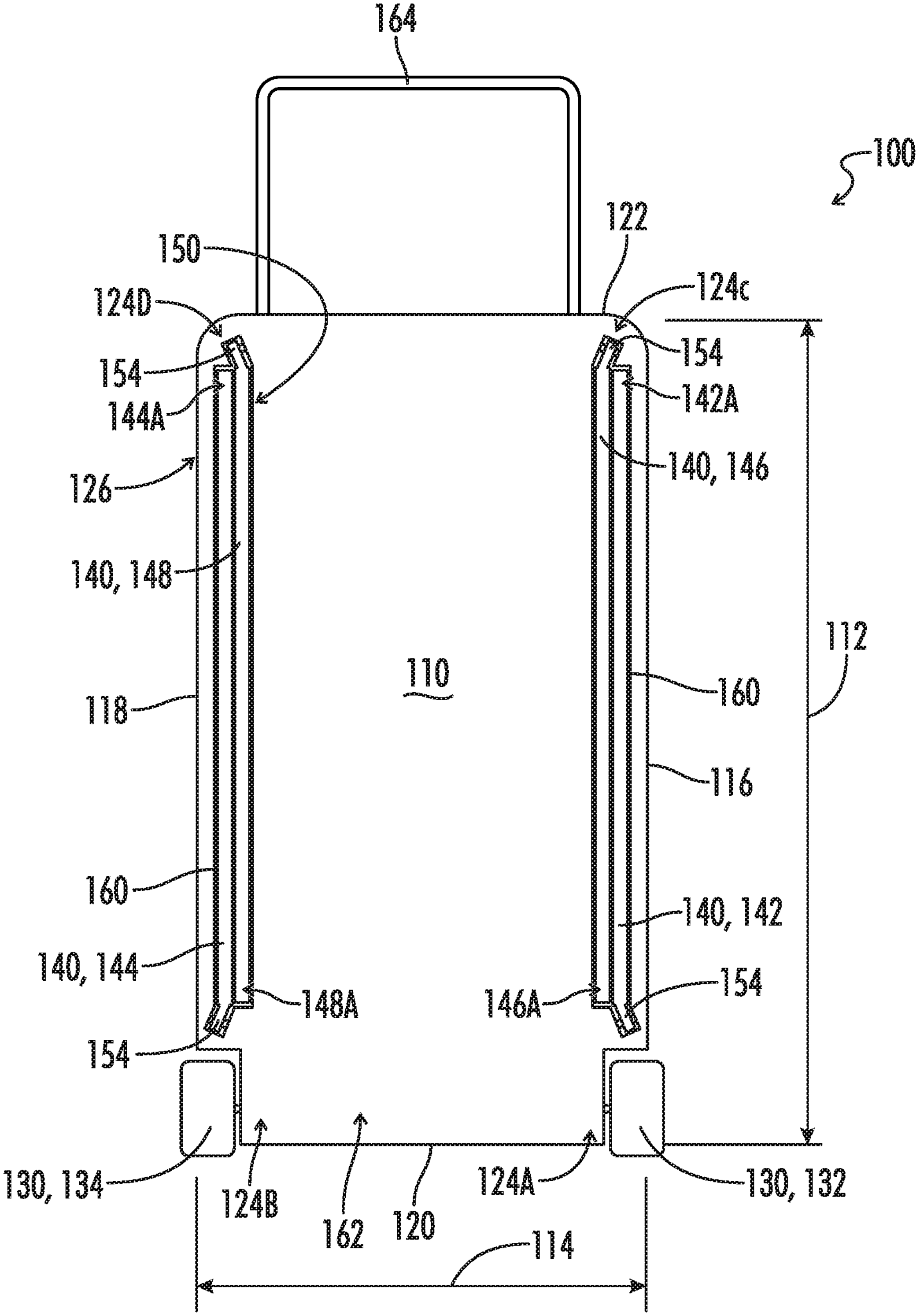
FIG. 4 is a bottom plan view of the combination bag workbench of FIG. 2.
Figure 5:
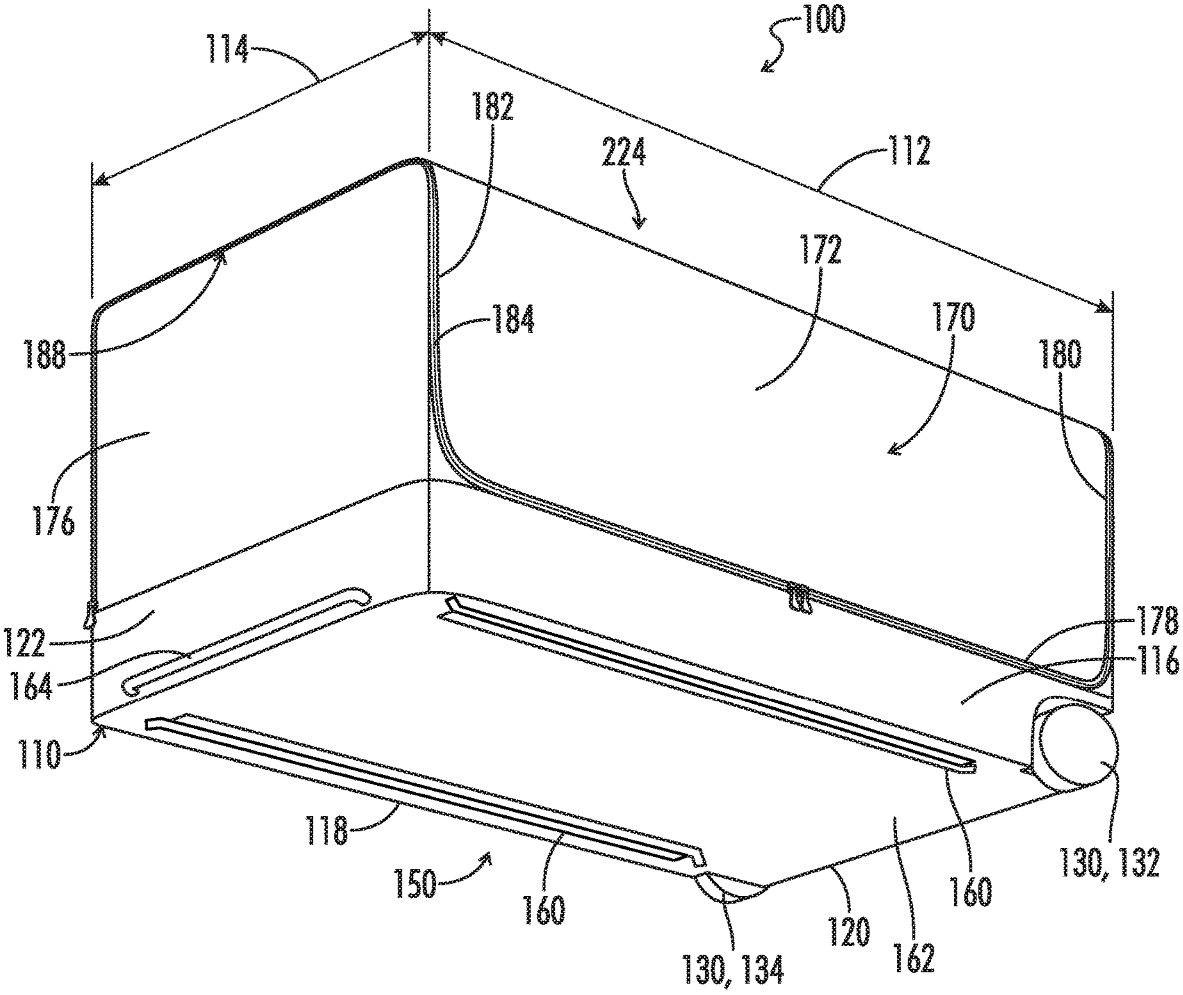
FIG. 5 is a bottom perspective view of the combination bag workbench of FIG. 2.
Figure 6:
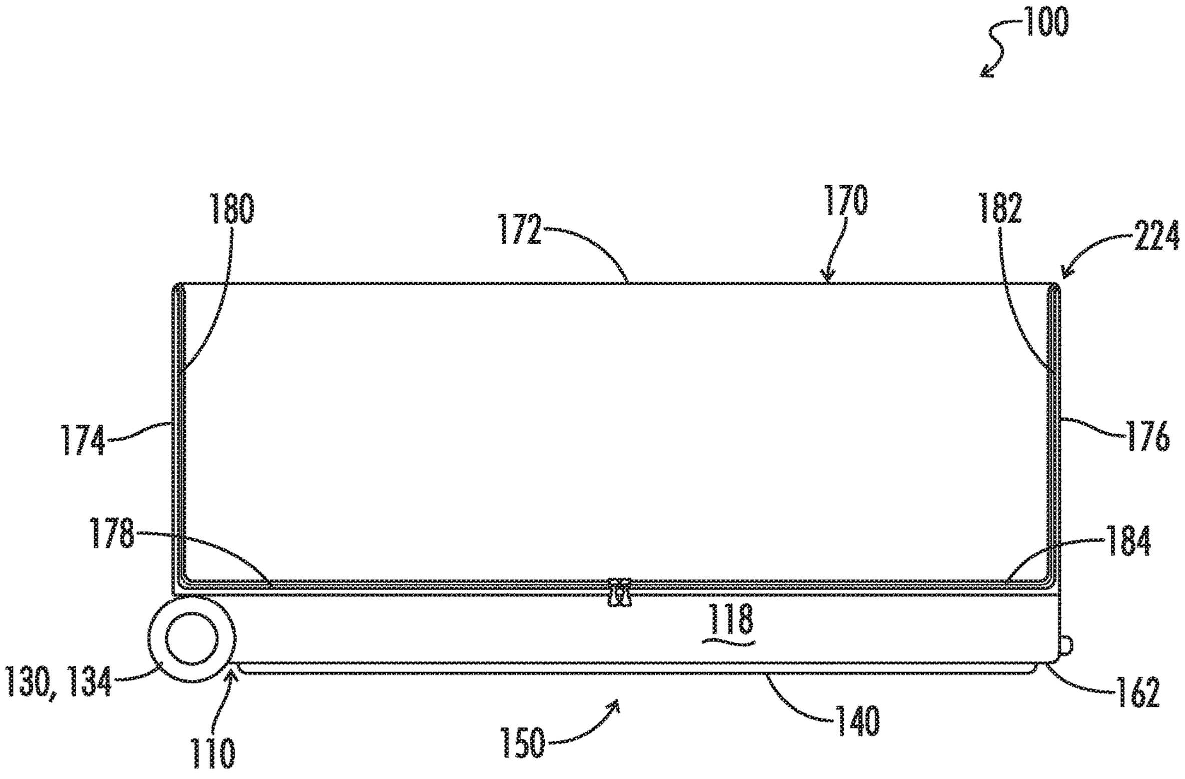
FIG. 6 is a right side elevation view of the combination bag workbench of FIG. 2 with the legs extending slightly below an underside of a bottom portion of the combination bag workbench in accordance with the present disclosure.

As can best be seen in FIGS. 4 and 5, in some embodiments, the four legs 140 may be positioned parallel to the length 112 of the bottom portion 110 when in the retracted position 150. More particularly, a majority of the length of each of the first, second, third and fourth legs 142, 144, 146, 148 may be positioned parallel to the length 112 of the bottom portion 110 when in the retracted position 150. Each of the four legs 140 may be dual angled such that they may be configured parallel to the length 112 of the bottom portion 110 when in the retracted position 150 and may be configured to extend beyond the nearest lengthwise and widthwise side when in the extended position 152. This dual angle of each of the four legs 140 may be accomplished by a selected type of pivotal connection to the bottom portion 140 or based on a shape of each of the four legs 140. As can best be seen in FIGS. 3-4, each of the four legs 140 may include an angled portion 154 positioned between a majority of the length of the respective leg and the pivotal connection to the bottom portion 140.

As can best be seen in FIGS. 3-5, in some embodiments, the bottom portion 110 may include recesses 160 for at least partially receiving the four legs 140. At least two of the four legs 140 when in the retracted position 150 may function as skids for protecting an underside 162 of the bottom portion 110. As can best be seen in FIG. 6, in some embodiments, the four legs 140 when in the retracted position 150 may protrude slightly below the underside 162 of the bottom portion 110 so as to enable the legs to function as skids. In certain embodiments, the first and third legs 142, 146 may be positioned as close as feasible to the first lengthwise side 116 and the second and fourth legs 144, 148 may be positioned as close as feasible to the second lengthwise side 118 in order to maximize a cross-sectional area of the bottom portion 110 for useable storage (i.e., to maximize an interior volume). In other embodiments (not shown), at least two of the four legs 140 may be positioned along the first and second lengthwise sides 116, 118, respectively, so as to function as edge protectors for the bottom portion 110.

As can best be seen in FIGS. 3 and 4, in some embodiments, the bag workbench may further include a handle 164 coupled to the bottom portion 110 and extendable from one of the first or second widthwise sides 120, 122. As illustrated, the handle 164 is extendable from the second widthwise side 122 of the bottom portion 110. As shown in FIG. 4, the handle 164 is extended from the second widthwise side 122 of the bottom portion 110. The handle 164 primarily functions to keep the bag workbench 100 away from a person's feet when pulling it, at an angle, along the support surface 102 supported by the pair of wheels 130.

As can best be seen in FIGS. 1, 2, and 5-11, the bag workbench 100 may further include a top portion 170. The top portion 170 may be coupled to the bottom portion 110 opposite the four legs 140. The top portion 170 may include a middle panel 172, a first end panel 174, and a second end panel 176. The middle panel 172 may be coupled to the first lengthwise side 116 of the bottom portion 110. The first end panel 174 may be hingedly coupled to the first widthwise side 120 of the bottom portion 110 and the second end panel 176 may be hingedly coupled to the second widthwise side 122 of the bottom portion 110. In some embodiments, the middle panel 172 may include a free end 178 positioned opposite from the end coupled to the first lengthwise side 116. The free end 178 of the middle panel 172 may be couplable to the second lengthwise side 118 of the bottom portion 110. The first and second end panels 174, 176 may be removably couplable to first and second sides 180, 182, respectively, of the middle portion 172.

In some embodiments, the top portion 170 may further include a continuous zipper 184 configured to couple the first and second end panels 174, 176 to the middle panel 172 and further configured to couple the free end 178 of the middle panel 172 to the second lengthwise side 118 of the bottom portion 110. As can best be seen in FIGS. 1, 2 and 5, in some embodiments, the continuous zipper 184 may include two downwardly open U-shaped portions 186, 188 surrounding the first and second end panels 174, 176, respectively.

As can best be seen in FIGS. 7-10, the top portion 170 may further include a front panel 190 hingedly coupled to the second lengthwise side 118 of the bottom portion 110. In optional embodiments, the front panel 190 may be couplable to the first and second end panels 174, 176 for maintaining the first and second end panels 174, 176 generally co-planar with the first and second widthwise sides 120, 122 of the bottom portion 110 when the middle panel 172 is not coupled to the first and second end panels 174, 176 along the second lengthwise side 118. In other embodiments (not shown), the front panel 190 may be coupled between the first and second end panels 174, 176 generally co-planar with the second lengthwise side 118 and not hingedly coupled to the second lengthwise side 118.

In optional embodiments, the first and second lengthwise and widthwise sides 116, 118, 120, 122 may extend upwardly from the bottom portion 110, away from the four legs 140, by a common height 202 to define an upward opening 204 of the bottom portion 110. Each of the first and second wheels 132, 134 of the pair of wheels 130 may include a common diameter 206. The common heights 202 of the first and second lengthwise and widthwise sides 116, 118, 120, 122 may be at least as great as one-half of the common diameter 206. This enables the first and second wheels 132, 134 to be substantially housed within the bottom portion 110 below the upper opening 204 of the bottom portion 110.

Figure 8:
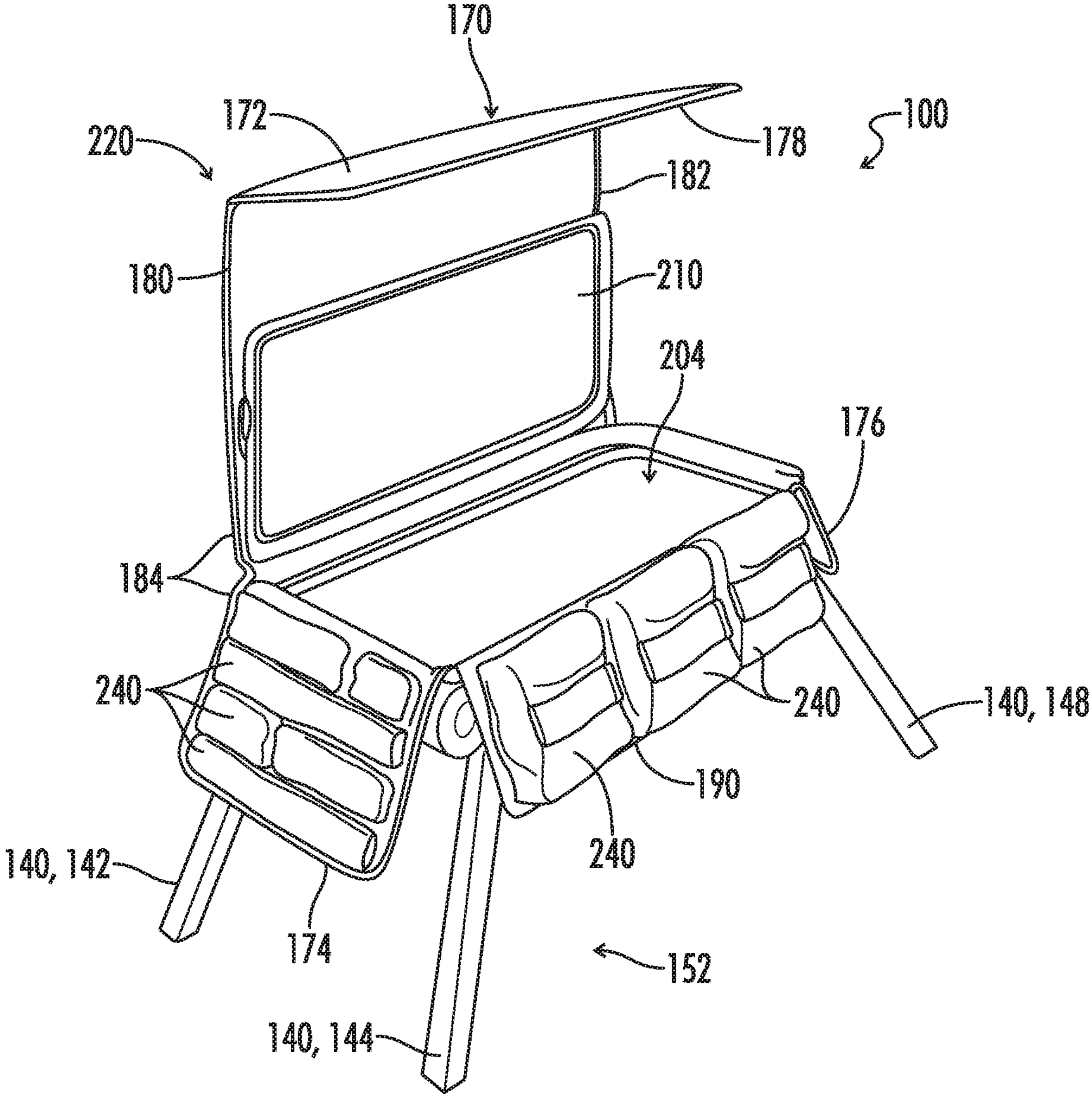
FIG. 8 is a top perspective view of the combination bag workbench of FIG. 1 with the top portion in an open configuration in accordance with the present disclosure.
Figure 9:
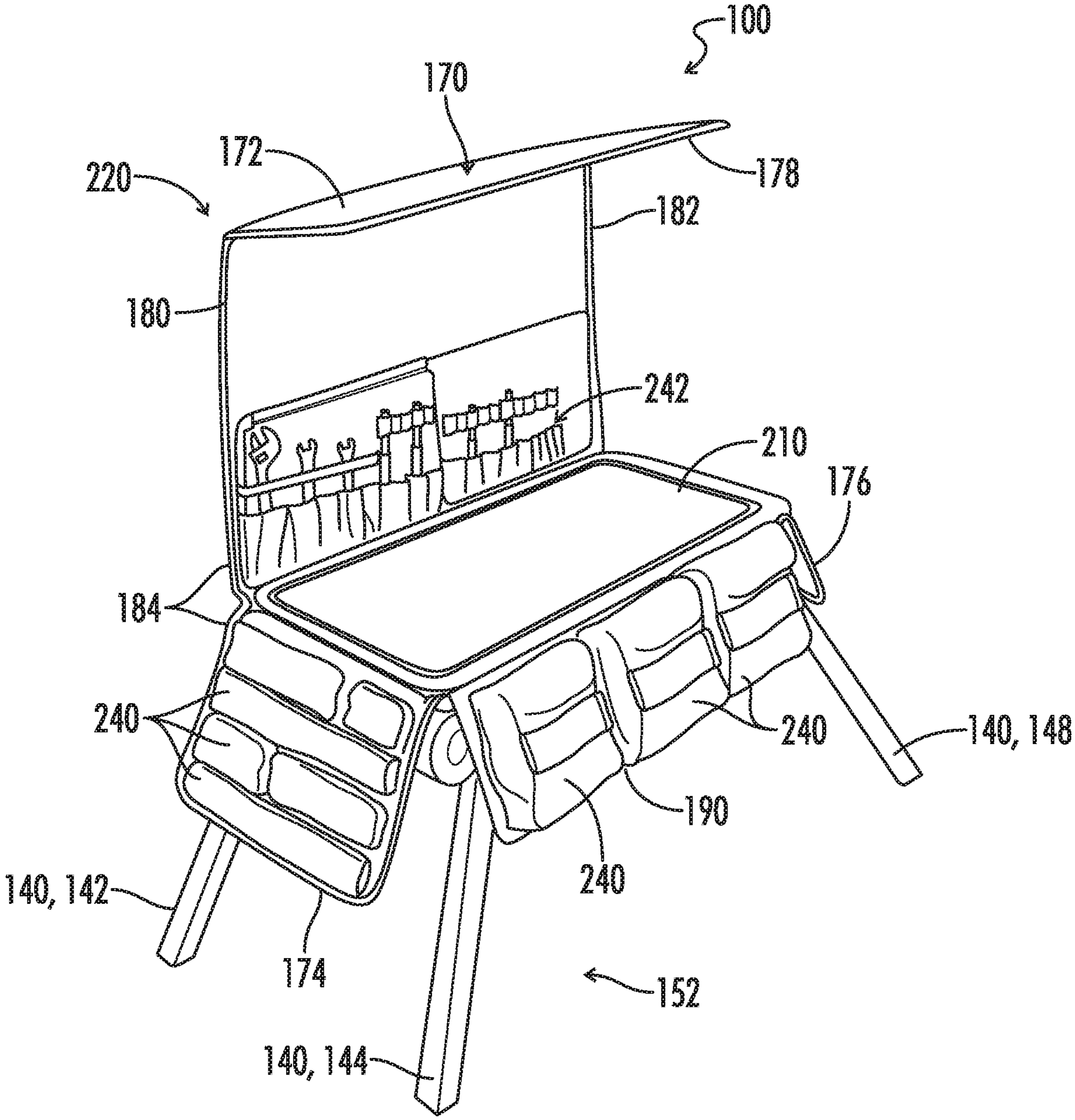
FIG. 9 is a top perspective view of the combination bag workbench of FIG. 8 with a work surface position above the bottom portion.
Figure 10:
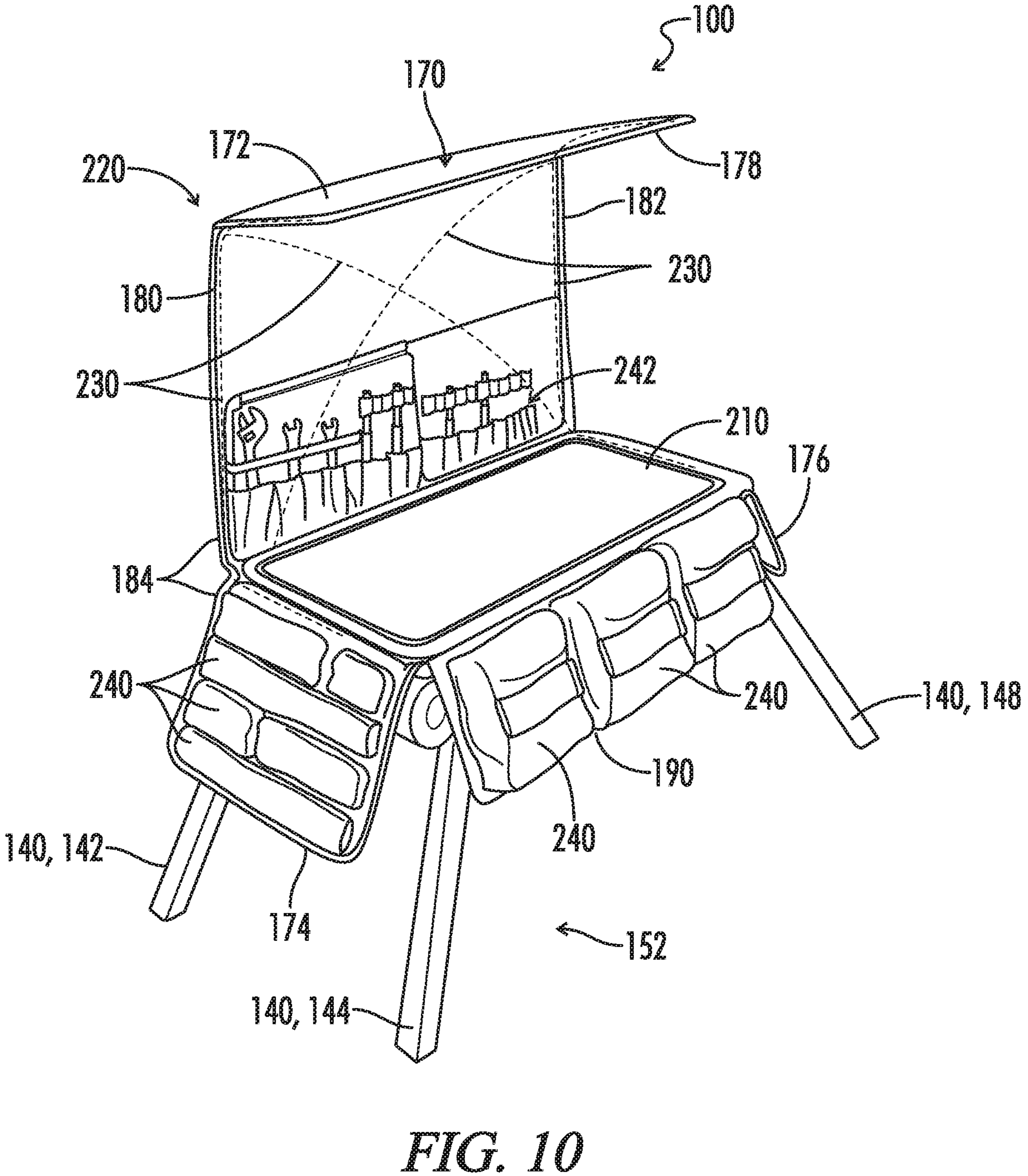
FIG. 10 is a top perspective view of the combination bag workbench of FIG. 9 showing a dashed internal support structure of the top portion of the combination bag workbench in the open configuration.
Figure 11:
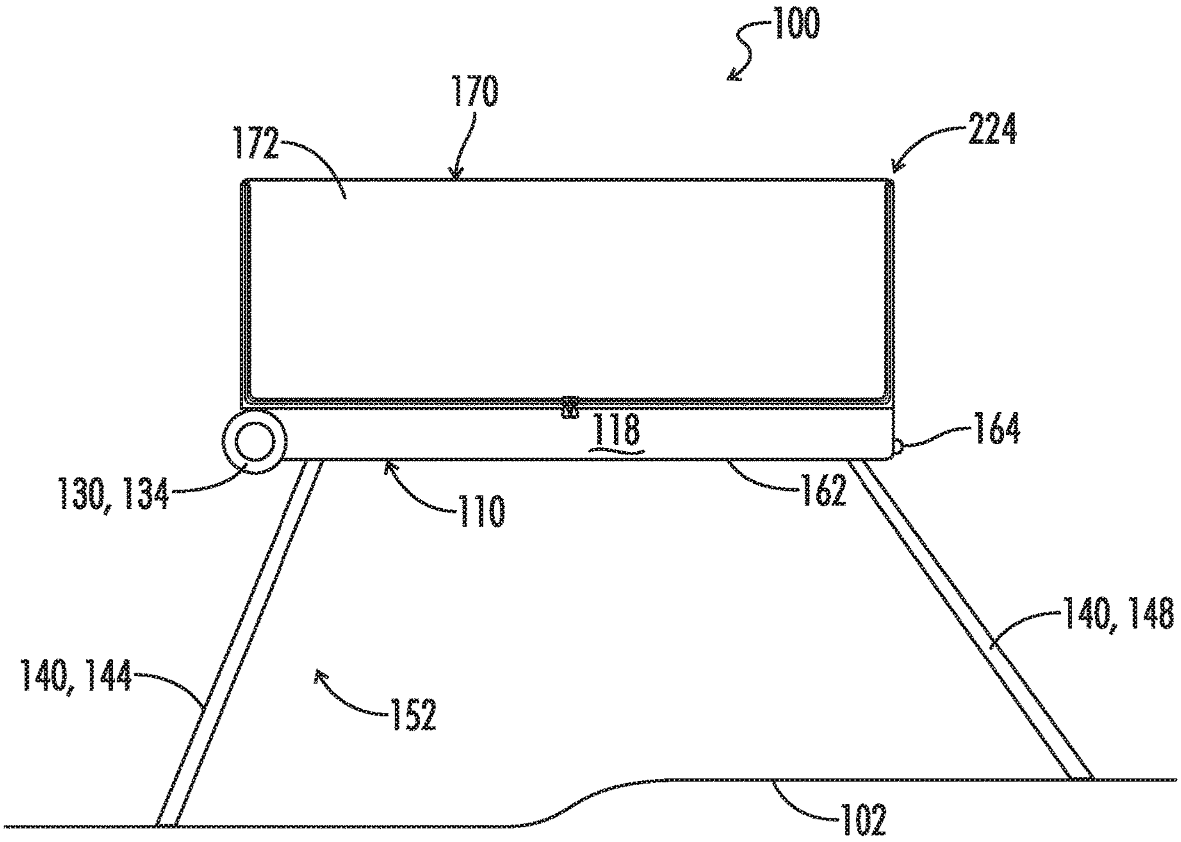
FIG. 11 is a right side elevation view of the combination bag workbench of FIG. 1 with the legs being independently adjustable in the extended position for leveling the bottom portion relative to an uneven support surface in accordance with the present disclosure.

As can best be seen in FIGS. 8-10, in some embodiments, the bag workbench 100 may further include a separable or removable work surface 210. The work surface 210 may also be referred to herein as a work tray 210. The work surface 210 may be positioned on top of the bottom portion 110 between the first and second lengthwise and widthwise sides 116, 118, 120, 122. The work surface may be configured to cover the upper opening 204 of the bottom portion 110. Accordingly, the work surface 210 may be positioned between the bottom portion 110 and the top portion 170 of the bag workbench 100. As can best be seen in FIGS. 9 and 10, the work surface 210 may be unobstructed on at least two sides when the top portion 170 is configured in an open configuration 220 (shown in FIGS. 8-10). The open configuration 220 may also be referred to herein as a work surface mode 220 to allow for maximal usage of and access to the work surface 210 from multiple sides.

The work surface 210 may be a hard, flat, and durable surface. The work surface 210 may ideally be lightweight so as to minimize its added weight to the bag workbench 100. The work surface 210 may be non-slip and easily cleaned. For example, the work surface 210 may be a rubber-coated rigid foam panel.

When the top portion 170 is in the open configuration 220, in some embodiments, the first and second end panels 174, 176 may be configured to be hinged open and to extend away from and below the upper opening 204 of the bottom portion 110. Similarly, the front panel 190 may be configured to be hinged open and to extend away from and below the upper opening 204 of the bottom portion 110. Accordingly, and as illustrated, the top portion 170 when in the open configuration 220 leaves the work surface 210 unobstructed on three sides.

Figure 7:
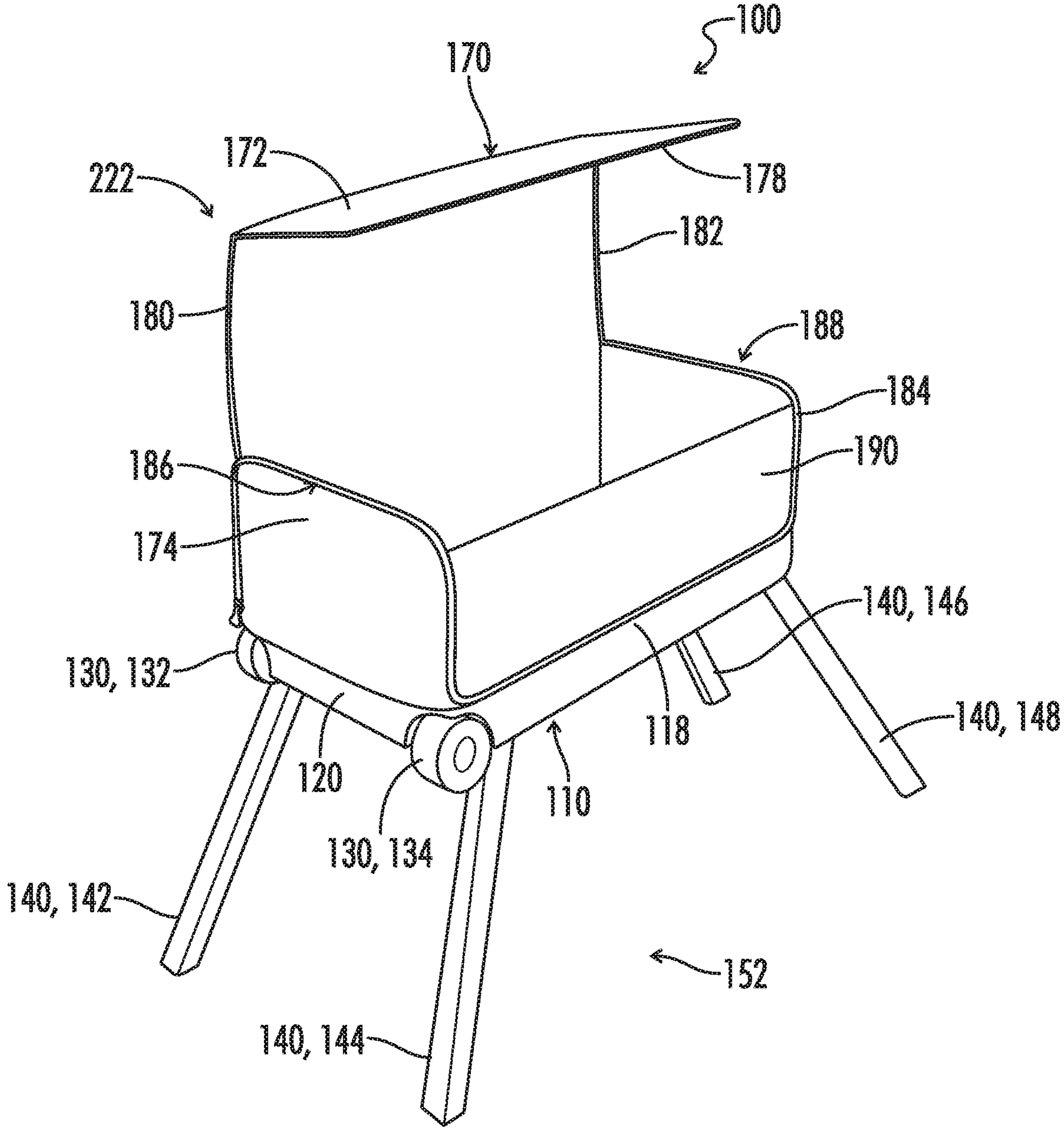
FIG. 7 is a top perspective view of the combination bag workbench of FIG. 1 with a top portion of the combination bag workbench in a partially open configuration in accordance with the present disclosure.

As can best be seen in FIG. 7, in some embodiments, the top portion 170 may be configured in a partially open configuration 222 associated with the front panel 190 being coupled between the first and second end panels 174, 176. The partially open configuration 222 may be further associated with the middle panel 172 being at least partially open and remaining at least partially coupled to the first and second end panels 174, 176 adjacent to the first lengthwise side 116 for helping maintain the first and second end panels 174, 176 vertically or co-planar with the first and second widthwise sides 120, 122, respectively. The partially open configuration 222 may also be referred to herein as a bag mode 222, wherein the bag workbench 100 may function similar to a regular rolling bag.

As can best be seen in FIGS. 1, 2, 5, 6, and 11, the top portion 170 may further be configured in a closed configuration 224. The closed configuration 224 is associated with the continuous zipper 184 be zipped closed so that the first and second end panels 174, 176 are coupled to the first and second sides 180, 182 of the middle panel 172 and the free end 178 of the middle panel 172 is coupled to the second lengthwise side 118 of the bottom portion 110. The closed configuration 224 may be useful for securing the contents of the top portion 170 and the bottom portion 110 when transporting the bag workbench 100.

As can best be seen in FIG. 10, the middle panel 172 of the top portion 170 may include an internal support structure 230 (shown in dashed lines) for supporting the middle panel 172 when the top portion 170 is in either the partially open configuration 222 or the open configuration 220. The internal support structure 230 may be selectively engageable or may automatically support the middle panel when the middle panel is disconnected from the second lengthwise side 118 and is at least partially disconnected from the first and second end panels 174, 176. The internal support structure 230 may utilize resilient carbon fiber poles or the like for supporting the middle panel 172. The internal support structure 230 may be coupled to the middle panel 172, either internally or externally. The internal support structure 230 may be coupled to the bottom portion 110 as a support base, so as to brace the middle panel 172.

In certain embodiments, the four legs 140 are configured to be lockable in the retracted position 150 and in the extended position 152. The four legs 140 may be lockable using a mechanical locking mechanism, friction-based locking mechanism, a singularity locking mechanism, or the like. Some examples of locking mechanisms which may be utilized include latches, ratchets, dog clutches, cam-based locking devices, and hydraulic locks. As can best be seen in FIG. 11, each of the four legs 140 may be independently adjustable and lockable when in the extended position 152 in order to enable the bottom portion 110 to be levelled relative to an uneven support surface 102. Accordingly, in some embodiments, each leg of the four legs 140 may be adjusted to a different elevation such as, for example, when the bag workbench is positioned diagonally along an uneven support surface 102.

The pivotal or rotatable connection between each of the four legs 140 and the bottom portion 110 may be enabled using any currently known or future created mechanical connection devices, such as a hinge joint or a ball and socket joint. In certain embodiments, the joint itself may be lockable. In other embodiments, the four legs 140 may be lockable in either the retracted position 150 or the extended position 152 using a mechanical locking mechanism (not shown) separate from or external to the joint.

In additional embodiments (not shown), the bag workbench 100 may include a leg assist mechanism to assist with opening and closing the four legs 140. The leg assist mechanism should enable quick and simple setup and takedown of the four legs 140 between the retracted position 150 and the extended position 152. In certain embodiments (not shown), the four legs may be biased toward the retracted position 150. In accordance with such an embodiment, when the four legs 140 are in the extended position 152, the leg assist mechanism may be actuated when the four legs 140 are free from obstruction to cause the four legs 140 to automatically fold into the retracted position 150. In other embodiments (not shown), the leg assist mechanism may be actuated to cause to four legs 140 to automatically move from the retracted position 150 to the extended position 152, such as when the bag workbench 100 is manually lifted or is positioned sideways such that the four legs 140 are free from any obstruction when transitioning between the retracted and extended positions 150, 152.

In still further embodiments (not shown), the bag workbench 100 may include a first leg opening assist mechanism and a second leg closing assist mechanism. The first leg opening assist mechanism may be actuated to cause the four legs 140 to move from the retracted position 150 to the extended position 152. The second leg closing assist mechanism may be actuated to cause the four legs 140 to move from the extended position 152 to the retracted position 150. In certain embodiments, the first and second leg opening assist mechanisms may be embodied in a single actuator.

As can best be seen in FIGS. 8-10, the top portion 170 may include storage pouches 240 and/or storage slots 242 for organizing gear and/or tools. As illustrated, the first and second end panels 174, 176 and the front panel 190 include the storage pouches 240 coupled thereto. The storage pouches 240 may be configured to securely hold their contents when in either an upright position, such as when the top portion 170 is in either the partially open configuration 222 or the closed configuration 224 (shown in FIGS. 1, 2, 5-7, and 11), and an inverted position, such as when the top portion is in the open configuration 220 (shown in FIGS. 8-10). As can best be seen in FIGS. 9 and 10, the middle panel 172 of the top portion 170 may include the storage slots 242 coupled thereto. Both the storage pouches 240 and the storage slots 242 may be modular. The placement of the storage pouches and slots 240, 242 may be customized by a user. The storage pouches and slots 240, 242 may be removably coupled to an interior surface of each of the middle panel 172, the first and second end panels 174, 176, or the front panel 190 using a modular placement mechanism such as Velcro or the like. The modular placement mechanism should allow for easy reconfiguration and customization of the storage pouches and slots 240, 242. In certain embodiments, the storage pouches and slots 240, 242 may include customizable labelling couplable thereto.

The bottom portion 110 may be formed from a rigid material which is durable so as to withstand the abuse of transporting and handling the bag workbench 100. The bottom portion 110 may also include additional ribs (not shown), which way work in combination with the four legs 140 to function as skids for protecting the underside 162 of the bottom portion 110 such as when going over hard edges such as stairs.

The top portion 170 may be formed from either a rigid or a nonrigid material. A rigid top portion 170 may be more case-like, while a non-rigid top portion 170 may be more bag-like. As illustrated, the top portion 170 is formed from a nonrigid material. The non-rigid material from which the top portion 170 is may be weatherproof so as to keep the contents of the top portion 170 dry. For example, the top portion 170 may comprise a vinyl-coated fabric with storm flaps (not shown) extending over the continuous zipper 184. In certain embodiments (not shown), the top portion 170 may include exterior branding using printing or fabric colors and patterns.

In certain embodiments (not shown), the top portion 170 may be formed from a rigid material, similar to that of the bottom portion 110. For example, in one potential embodiment, the rigid top portion 170 may include two halves, each pivotally coupled along one of the first or second widthwise edges 120, 122. When positioned in a pivoted-out configuration, the two halves may be positioned below and be co-planar with the upper opening 204 of the bottom portion 110. In such an embodiment, the work surface 210 may be expandable or the bag workbench 100 may include additional work surface panels (not shown) which may be positioned on the pivoted-out top portion halves for expanding an area of the work surface 210. Other embodiments (not shown) of the rigid top portion 170 may be possible such as, for example, one which is pivotally coupled to one of the first or second lengthwise edges 116, 118.

In other embodiments (not shown), the first end panel 174 of the top portion 170 may include additional wheels attached thereto. The additional wheels may enable the bag workbench 100 to be maneuvered along the support surface 102 in a vertical position like many other rolling bags.

In certain embodiments (not shown), the top portion 170 may include segmented portions with zippered mesh vents so as to enable a user to segment sweaty gear and allow it to breathe and dry out. In such an embodiment, the zippered mesh vents may be accessible from an interior or an exterior of the top portion 110. Additionally, the zippered mesh vents may be communicable with an exterior of the top portion 110 so as to enable access to fresh air and avoid molding and/or mildewing of the contents. In other embodiments (not shown), the top portion 170 may include additional segmented portions accessible from either an exterior or interior of the top portion 170 for storing designated items such as keys, wallet, phone, goggles, sunglasses, or the like. These additional segmented portions may be strategically placed so as to be accessible when the top portion 170 is configured in any one of the open, partially open, or closed configurations 220, 222, 224.

In further embodiments (not shown), the bag workbench 100 may include an additional removable panel to stand on when changing shoes or boots.

In still further embodiments (not shown), the bag workbench 100 may include various other additional accessories or optional upgrades, such as a lighting module, a solar panel, a mountain bike frame stand, a vice, or the like.

In other embodiments (not shown), the front panel 190 may be hinged inwardly and stored within the bottom portion 110 beneath the work surface 210 when not in use. Similarly, the first and second end panels 174, 176 may include internal flaps hingedly coupled along the first and second widthwise sides 120, 122, respectively, between the first and second end panels 174, 176. The internal flaps may be used in conjunction with the storage pouches 240 and storage slots 242 and may be hingedly stored within the bottom portion 110 beneath the work surface 210 or may be hingedly pivoted outward when the top portion 170 is in the open configuration 220.

In certain embodiments (not shown), the terminal portion 142A, 144A, 146A, 148A of each leg extends laterally beyond the nearest lengthwise side of the first and second lengthwise sides 116, 118 only. In other embodiments (not shown), the terminal portion 142A, 144A, 146A, 148A of each leg extends laterally beyond the nearest widthwise side of the first and second widthwise sides 120, 122 only. In still further embodiments (not shown), the terminal portion 142A, 144A, 146A, 148A of each leg may not extend laterally beyond any of the first and second lengthwise sides 116, 118 or the first and second widthwise sides 120, 122.

In other embodiments (not shown), each of the four legs 124, when in the extended position 152, may include a telescoping feature in order to adjust an elevation of the underside 162 of the bottom portion 110 from the support surface 102 for leveling the. In further embodiments (not shown), as opposed to the four legs 124 being pivotally coupled to the bottom portion 110, they may be entirely telescopic and stored within at least the bottom portion 110 either vertically at each corner or at an angle so as to allow them to extend laterally beyond at least one of the nearest lengthwise side of the first and second lengthwise sides 116, 118 or the nearest widthwise side of the first and second widthwise sides 120, 122.

In certain embodiments (not shown), the bag workbench 100 may include less than four legs. In some embodiments (not shown), the bag workbench 100 may only include three legs, two of which may be pivotally coupled proximate to either the first widthwise side 120 or the second widthwise side 122, and the other of which may be pivotally coupled proximate to the other of the first widthwise side 120 or the second widthwise side 122. In accordance with this embodiment, the legs may or may not extend laterally beyond the nearest lengthwise side of the first and second lengthwise sides 116, 118 or the nearest widthwise side of the first and second widthwise sides 120, 122.

In other embodiments (not shown), the bag workbench 100 may include only two legs. In accordance with this embodiment, the two legs could be configured like those of an ironing board wherein the terminal portions are typically T-shaped. Alternatively (not shown), the two legs could be C-shaped or the like. Each of the two free ends of the C-shaped legs could be pivotally attached proximate to a corner of the bottom portion 110. Alternatively, a top portion of each C-shaped leg could be pivotally coupled proximate to and along one of the first widthwise side 120 or the second widthwise side 122, and a bottom portion of each C-shaped leg could support the bag workbench 100 by interacting with the support surface 102.

In further embodiments (not shown), the pair of wheels 130 may be coupled to two of the four legs 124 as opposed to being coupled to the bottom portion 110 along one of the first or second widthwise sides 120, 122. Based on the embodiment of the bag workbench 100 shown, it is likely that the first wheel 132 would be coupled to the terminal portion 146A of the third leg 146 and that the second wheel 134 would be coupled to the terminal portion 148A of the fourth leg 148. In other embodiments (not shown), such as those described above with two and third legs, the pair of wheels 130 could be coupled to at least one of the legs. By attaching the wheels to the terminal portions of two of the four legs 124, the case workbench 100 can be easily repositioned, even when the four legs 124 are configured in the extended position 152. Additionally, the pair of wheels 130 may be coupled to the legs such that their angle can be adjusted in order to maintain the pair of wheels 130 parallel to the first and second lengthwise sides 116, 118 regardless of whether the four legs 124 are configured in the retracted positioned 150 or the extended position 152.

To facilitate the understanding of the embodiments described herein, a number of terms have been defined above. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful multipurpose bag table apparatus, it is not intended that such references be construed as limitations upon the scope of this disclosure except as set forth in the following claims.

What is claimed is:

1. A combination bag workbench comprising:

a rectangular bottom portion including first and second lengthwise sides and first and second widthwise sides;

a plurality of legs pivotally coupled to the bottom portion between the first and second lengthwise sides and the first and second widthwise sides, the plurality of legs configured to selectably support the bottom portion above a support surface;

a top portion coupled to the bottom portion opposite the plurality of legs, the top portion including a middle panel coupled to the first lengthwise side, a first end panel hingedly coupled to the first widthwise side, and a second end panel hingedly coupled to the second widthwise side, the middle panel including a free end positioned opposite the first lengthwise side, the free end removably couplable to the second lengthwise side, the first and second end panels are removeably couplable to first and second sides of the middle portion; and first and second wheels coupled to the bottom portion, the first wheel at least partially overlapping the first lengthwise side, the second wheel at least partially overlapping the second lengthwise side.

2. The combination back workbench of claim 1, wherein:

the plurality of legs are configurable in one of a pivoted-in position or a pivoted-out position; and the plurality of legs are configured to support the bottom portion above a support surface in the pivoted-out position.

3. The combination bag workbench of claim 2, wherein:

at least one of the plurality of legs is positioned parallel to the first and second lengthwise sides when in the pivoted-in position.

4. The combination bag workbench of claim 2, wherein:

at least a portion of at least one of the plurality of legs is configured to extend beyond at least one of a nearest lengthwise side of the first and second lengthwise sides or a nearest widthwise side of the first and second widthwise sides when in the pivoted-out position.

5. The combination bag workbench of claim 2, wherein:

at least one of the plurality of legs is independently adjustable when in the pivoted-out position for leveling the bottom portion relative to an uneven support surface upon which the legs interact.

6. The combination bag workbench of claim 1, wherein:

the bottom portion includes at least one recesses for at least partially receiving the plurality of legs.

7. The combination bag workbench of claim 6, wherein:

at least two of the plurality of legs when configured in a pivoted-in position function as skids for protecting an underside of the bottom portion.

8. The combination bag workbench of claim 1, wherein:

the first and second lengthwise and widthwise sides extend upwardly from an underside of the bottom portion by a common height;

the first and second wheels include a common diameter; and the common height is at least as great as one-half of the common diameter.

9. The combination bag workbench of claim 1, further comprising:

a handle coupled to the bottom portion and extendable from one of the first or second widthwise sides of the bottom portion.

10. The combination bag workbench of claim 1, further comprising:

a separable worksurface positioned on top of the bottom portion between the first and second lengthwise and widthwise sides opposite an underside of the bottom portion.

11. The combination bag workbench of claim 10, wherein:

the first and second lengthwise and widthwise sides extend upwardly from the bottom portion away from the underside to define an upper opening of the bottom portion; and the worksurface is configured to cover at least a majority of the upper opening of the bottom portion.

12. The combination bag workbench of claim 1, further comprising:

a rectangular worksurface positionable between the bottom portion and the top portion, wherein the rectangular worksurface is unobstructed on at least 2 sides when the top portion is in an open configuration.

13. The combination bag workbench of claim 1, wherein:

the first and second end panels when hinged open extend away from and below an upper opening of the bottom portion.

14. The combination bag workbench of claim 1, wherein: the top portion includes a continuous zipper for coupling the first and second end panels to the middle panel and for coupling the middle panel to the second lengthwise side of the bottom portion.

15. The combination bag workbench of claim 14, wherein:

the continuous zipper includes two downwardly open U-shaped portions surrounding the first and second end panels, respectively.

16. The combination bag workbench of claim 1, wherein: the top portion further includes a front panel hingedly coupled to the second lengthwise side; and front panel is couplable to the first and second end panels.

17. A combination bag workbench comprising:

a rectangular bottom portion including first and second lengthwise sides and first and second widthwise sides, the first and second lengthwise and widthwise sides extending upwardly from an underside of the bottom portion by a common height;

a plurality of legs pivotally coupled to the bottom portion between the first and second lengthwise sides and the first and second widthwise sides, the plurality of legs configured to selectably support the bottom portion above a support surface;

a top portion coupled to the bottom portion opposite the plurality of legs, the top portion including a middle panel coupled to the first lengthwise side, a first end panel hingedly coupled to the first widthwise side, and a second end panel hingedly coupled to the second widthwise side, the middle panel including a free end positioned opposite the first lengthwise side, the free end removably couplable to the second lengthwise side, the first and second end panels are removeably couplable to first and second sides of the middle portion; and first and second wheels coupled to the bottom portion, the first and second wheels having a common diameter, the common height of the first and second lengthwise and widthwise sides being at least as great as one-half of the common diameter.

18. A combination bag workbench comprising:

a rectangular bottom portion including first and second lengthwise sides and first and second widthwise sides;

a plurality of legs pivotally coupled to the bottom portion between the first and second lengthwise sides and the first and second widthwise sides, the plurality of legs configured to selectably support the bottom portion above a support surface;

a top portion coupled to the bottom portion opposite the plurality of legs, the top portion including a middle panel coupled to the first lengthwise side, a first end panel hingedly coupled to the first widthwise side, and a second end panel hingedly coupled to the second widthwise side, the middle panel including a free end positioned opposite the first lengthwise side, the free end removably couplable to the second lengthwise side, the first and second end panels are removeably couplable to first and second sides of the middle portion; and a handle coupled to the bottom portion and extendable from one of the first or second widthwise sides of the bottom portion.

19. A combination bag workbench comprising:

a rectangular bottom portion including first and second lengthwise sides and first and second widthwise sides;

a plurality of legs pivotally coupled to the bottom portion between the first and second lengthwise sides and the first and second widthwise sides, the plurality of legs configured to selectably support the bottom portion above a support surface;

a top portion coupled to the bottom portion opposite the plurality of legs, the top portion including a middle panel coupled to the first lengthwise side, a first end panel hingedly coupled to the first widthwise side, and a second end panel hingedly coupled to the second widthwise side, the middle panel including a free end positioned opposite the first lengthwise side, the free end removably couplable to the second lengthwise side, the first and second end panels are removeably couplable to first and second sides of the middle portion; and a separable worksurface positioned on top of the bottom portion between the first and second lengthwise and widthwise sides opposite an underside of the bottom portion, wherein the first and second lengthwise and widthwise sides extend upwardly from the bottom portion away from the underside to define an upper opening of the bottom portion, and the worksurface is configured to cover at least a majority of the upper opening of the bottom portion.

20. A combination bag workbench comprising:

a rectangular bottom portion including first and second lengthwise sides and first and second widthwise sides;

a plurality of legs pivotally coupled to the bottom portion between the first and second lengthwise sides and the first and second widthwise sides, the plurality of legs configured to selectably support the bottom portion above a support surface; and a top portion coupled to the bottom portion opposite the plurality of legs, the top portion including a middle panel coupled to the first lengthwise side, a first end panel hingedly coupled to the first widthwise side, and a second end panel hingedly coupled to the second widthwise side, the middle panel including a free end positioned opposite the first lengthwise side, the free end removably couplable to the second lengthwise side, the first and second end panels are removeably couplable to first and second sides of the middle portion, the top portion further including a front panel hingedly coupled to the second lengthwise side and further couplable to the first and second end panels.

* * * * *